United States Patent
Saito

(10) Patent No.: US 11,666,828 B2
(45) Date of Patent: Jun. 6, 2023

(54) COMPUTER-EXECUTABLE GAME ON A GRAPHICAL USER INTERFACE WITH VALIDITY PERIODS FOR GAME CONTENT

(71) Applicant: GREE, INC., Tokyo (JP)

(72) Inventor: Jun Saito, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/546,619

(22) Filed: Dec. 9, 2021

(65) Prior Publication Data

US 2022/0096936 A1  Mar. 31, 2022

Related U.S. Application Data

(63) Continuation of application No. 16/777,026, filed on Jan. 30, 2020, now Pat. No. 11,224,816, which is a
(Continued)

(30) Foreign Application Priority Data

Jul. 31, 2017 (JP) .............................. JP2017-148400

(51) Int. Cl.
A63F 13/69 (2014.01)
A63F 13/537 (2014.01)

(52) U.S. Cl.
CPC ............ *A63F 13/69* (2014.09); *A63F 13/537* (2014.09)

(58) Field of Classification Search
CPC ................................ A63F 13/69; A63F 13/537
See application file for complete search history.

(56) References Cited

U.S. PATENT DOCUMENTS

2008/0096668 A1*  4/2008  Yoshioka ................ A63F 13/85
463/42
2013/0324210 A1* 12/2013  Doig .................... G07F 17/3293
463/19
(Continued)

FOREIGN PATENT DOCUMENTS

JP        2014188012 A      10/2014
JP        2015036034 A       2/2015
(Continued)

OTHER PUBLICATIONS

Nov. 6, 2018 International Search Report issued in International Patent Application No. PCT/JP2018/028562.
(Continued)

*Primary Examiner* — Steve Rowland
(74) *Attorney, Agent, or Firm* — Oliff PLC

(57) ABSTRACT

An information processing device that progresses a game using a game content associated with a player. In response to receiving an obtaining request, the device selects a subset of game contents, where a portion of the game contents has a same identification information and each of the portion of the game contents has a different validity period. The device obtains a validity period associated with each of the selected game contents. When a first game content associated with the player has the same identification information as a second game content, the device updates, for each game content, a validity period of the first game content based on the validity period of the second game content in the subset of game contents. The device then restricts use of the first game content in the game when the validity period of the first game content lapses.

11 Claims, 8 Drawing Sheets

Related U.S. Application Data continuation of application No. PCT/JP2018/028562, filed on Jul. 31, 2018.

(56) References Cited

U.S. PATENT DOCUMENTS

| | | | | |
|---|---|---|---|---|
| 2014/0187329 | A1* | 7/2014 | Suga | A63F 13/30 463/31 |
| 2015/0011319 | A1* | 1/2015 | Satsuma | A63F 13/69 463/42 |
| 2018/0264366 | A1* | 9/2018 | Kawahara | A63F 13/798 |

FOREIGN PATENT DOCUMENTS

| | | |
|---|---|---|
| JP | 2015-128567 A | 7/2015 |
| JP | 5817900 B1 | 11/2015 |
| JP | 2016-165360 A | 9/2016 |
| JP | 2016-214465 A | 12/2016 |
| JP | 2017-721 A | 1/2017 |
| JP | 2017-12422 A | 1/2017 |
| JP | 2017-55997 A | 3/2017 |
| KR | 101280394 B1 | 7/2013 |

OTHER PUBLICATIONS

"Red Stone Hunter", Mar. 14, 2015, pp. 1-17; https://web.archive.org/web/20150314195003/http://rsh.webcrow.jp/minipetcomposition.html.

Nov. 8, 2018 International Preliminary Report on Patentability issued in International Patent Application No. PCT/JP2018/028562.

Mar. 30, 2021 Office Action issued in Japanese Patent Application No. 2019-534520.

Sep. 9, 2021 Notice of Allowance issued in U.S. Appl. No. 16/777,026.

Apr. 6, 2021 Office Action issued in U.S. Appl. No. 16/777,026.

* cited by examiner

Fig.4A

| Card | Rarity | Validity Period | Drawn Probability |
|---|---|---|---|
| Card A | S | 30 Hours | 1% |
| | | 20 Hours | 2% |
| | | 10 Hours | 3% |
| Card B | R | 30 Hours | 8% |
| | | 20 Hours | 9% |
| | | 10 Hours | 10% |
| ... | ... | ... | ... |
| Total | | | 100% |

Fig.4B

| Card | Rarity | Validity Period | Number of Cards in Box |
|---|---|---|---|
| Card A | S | 30 Hours | 1 |
| | | 20 Hours | 2 |
| | | 10 Hours | 3 |
| Card B | R | 30 Hours | 8 |
| | | 20 Hours | 9 |
| | | 10 Hours | 10 |
| ... | ... | ... | ... |
| Total | | | 100 |

Fig.5

| Card | Rarity | Validity Period | Drawn Probability |
|---|---|---|---|
| Card A | S | 30 Hours | 2% |
| | | 20 Hours | 3% |
| | | 10 Hours | 4% |
| Card B | R | 30 Hours | 7% |
| | | 20 Hours | 8% |
| | | 10 Hours | 9% |
| ... | ... | ... | ... |
| Total | | | 100% |

COMPUTER-EXECUTABLE GAME ON A GRAPHICAL USER INTERFACE WITH VALIDITY PERIODS FOR GAME CONTENT

This is a Continuation of U.S. application Ser. No. 16/777,026 filed on Jan. 30, 2020, which is a Bypass Continuation of PCT/JP2018/028562 filed on Jul. 31, 2018, which claims the benefit of Japanese Patent Application No. 2017-148400 filed on Jul. 31, 2017. The disclosure of the prior applications is hereby incorporated by reference herein in its entirety.

BACKGROUND

1. Field

The present disclosure relates to a program, a method, and an information processing device for processing progress of a game.

2. Description of Related Art

Recently, developments have been made for games in which game contents that can be used by a player are provided either free-of-charge or for a fee. Japanese Laid-Open Patent Publication No. 2016-214465 (JP 2016-214465) discloses a game in which a character card, which is a game content, is provided for a player free-of-charge only when the game is played for the first time and a character card advantageous for the game to progress is provided for the player for a fee. In the game of JP 2016-214465, whereas the player is provided with a free character card determined at a predetermined probability through a lottery, the player can select a non-free character card that is to be provided. In the game of JP 2016-214465, the player can use a card that has once been provided at any time.

As described above, in the game of JP 2016-214465, a game content provided for free and a game content provided for a fee become the possessions of the player once the game contents are provided. Further, the player can use the game contents at any time. Thus, even if a new game content is introduced into the game, a large number of players may be able to use the game content. As a result, the rareness or value of the game content cannot be maintained.

SUMMARY

It is an objective of the present disclosure to provide a program, a method, and an information processing device for a game that maintain the rareness or value of a game content even if the game content has been provided for a player.

Means for Solving the Problem

A program according to one aspect of the present disclosure causes a computer to execute a progress function to cause a game to progress using a game content associated with a player, a storing function to store a plurality of game contents having the same identification information of game content, different validity periods being set for the game contents, a selection function to select a set of game contents from the plurality of game contents if an obtaining request for game content is received from the player, a setting function to obtain a validity period associated with each of the selected game contents and update, for each game content, a validity period of a first game content associated with the player based on the validity period of the selected game content if the first game content includes the same identification information as the selected game content, and a restriction function to restrict use of the first game content in the game if the validity period of the first game content associated with the player lapses.

The selection function may select the game content based on a provision probability that changes as a number of times of the obtaining request increases. A provision probability of providing the game content may be set for the validity period of the game content. The selection function may select, in a single selection of the game content, the set of game contents from game contents associated with validity periods for which the same provision probability is set.

A provision probability of providing the game content may be set for the validity period of the game content. The selection function may select, in a single selection of the game content, the set of game contents from game contents associated with validity periods for which different provision probabilities are set.

The storing function may store validity periods that differ in number or length in association with game contents each having different identification information. The selection function may differentiate provision probabilities among game contents each having different identification information and associated with the same validity period.

The program according to the above-described aspect of the present disclosure may cause the computer to execute a display function to display a validity period set for the game content. If the setting function sets a new validity period for the game content, the display function may display the new validity period.

If the obtaining request is received from the player, the selection function may request a fee from the player and increases the fee each time a number of times of the obtaining request increases. The selection function may change, during occurrence of a game event, the fee requested from the player based on a remaining time until a point in time the game event ends.

A method according to one aspect of the present disclosure includes a progress step for causing a game to progress using a game content associated with a player, a storing step for storing a plurality of game contents having the same identification information of game content, different validity periods being set for the game contents, a selection step for selecting a set of game contents from the plurality of game contents if an obtaining request for game content is received from the player, a setting step for obtaining a validity period associated with each of the selected game contents and updating, for each game content, a validity period of a first game content associated with the player based on the validity period of the selected game content if the first game content includes the same identification information as the selected game content, and a restriction step for restricting use of the first game content in the game if the validity period of the first game content associated with the player lapses.

An information processing device according to one aspect of the present disclosure includes a progress processor that causes a game to progress using a game content associated with a player, a memory processor that stores a plurality of game contents having the same identification information of game content, different validity periods being set for the game contents, a selection processor that selects a set of game contents from the plurality of game contents if an obtaining request for game content is received from the player, a setting processor that obtains a validity period associated with each of the selected game contents and updates, for each game content, a validity period of a first game content associated with the player based on the validity period of the selected game content if the first game content includes the same identification information as the selected game content, and a restriction processor that restricts use of the first game content in the game if the validity period of the first game content associated with the player lapses.

The program according to the aspect of the present disclosure can be implemented with at least the following three configurations. That is, the program may be executed with: configuration (a) in which the information processing device functions as a client device (for example, a smartphone or a personal computer) and the program is executed on the client device; configuration (b) in which the information processing device functions as a server device (for example, a mainframe, a cluster computer, or any computer that can provide a game service for an external device), part of or all of the program is executed on the server device, and the result of the executed process is returned to a client device; or configuration (c) in which the process included in the program is shared by a client device and a server device.

Accordingly, the display function achieved by the program may cause a display device to display a game view by (a) outputting information (for example, display information) to an external display device (for example, a display of a mobile terminal) that is communicably connected to the information processing device via a predetermined network (for example, the Internet) or (b) by outputting display information to a display device of the information processing device.

Further, the following configuration may be employed: (a) a client device communicably connected to the information processing device via a predetermined network (for example, the Internet) includes a predetermined input device, the client device transmits, to the information processing device, operation input information that has been input via the predetermined input device (for example, a touch panel of a mobile terminal), and an information processing function achieved by the program on the information processing device obtains the operation input information; and (b) an information processing device includes a predetermined input device and an information processing function obtains operation input information via the predetermined input device.

BRIEF DESCRIPTION OF THE DRAWINGS

FIGS. 4A and 4B show example configurations of data stored in a memory of the server in the embodiment.

FIG. 5 shows another example configuration of data stored in the memory of the server in the embodiment.

DETAILED DESCRIPTION

Figure 1:
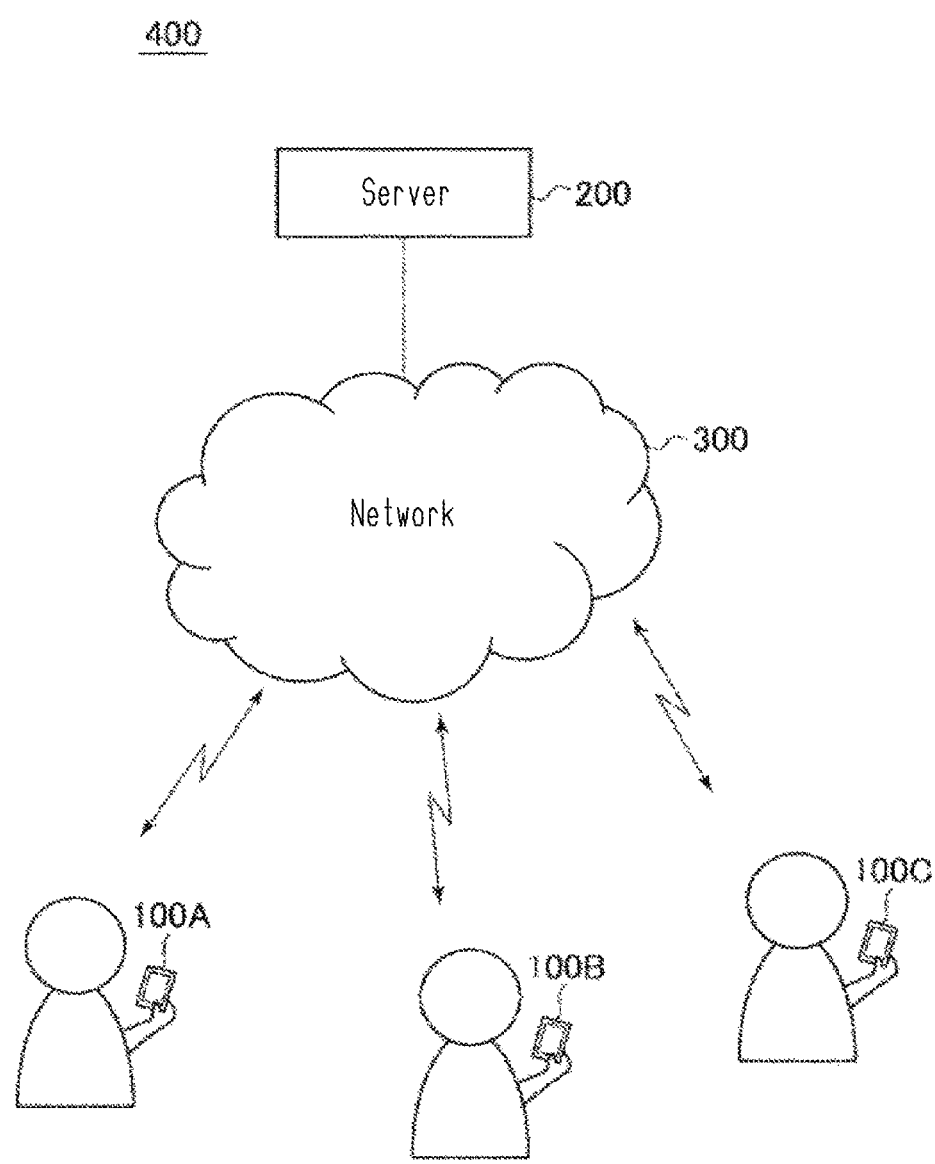
FIG. 1 is a schematic diagram showing the configuration of a game system according to an embodiment.

An aspect of the present invention will now be described in detail with reference to the drawings. In a game system of an embodiment, a game content such as a card can be given to a player by gacha, which refers to a free or non-free lottery mode. For some game contents such as cards given by gacha, validity periods in which the game contents can be used in a game are set. The player can use the game contents during the validity periods for the game to progress. Since the validity periods are set for the game contents, the rareness or value of each of the game contents can be maintained even in a case in which the player has been provided with the game content. In addition, in a game system of an embodiment, the game content has time-related properties. This provides the player with various ways to obtain game contents without excessively increasing the processing load and the amount of data for mobile terminals 100 (100A to 100C) and a server 200. The validity period starts at a predetermined point in time, for example, when the player obtains the game content, when the player is associated with the game content, when the game content is set for a predetermined region in a predetermined view displayed during the execution of the game, and when the game content produces an effect in the game. The validity period includes a time period such as "10 hours," the number of days such as "1 day," and a period in which a starting day (time) and an ending day (time) are defined such as "August 1 (12:00) to August 5 (12:00)." The validity period also includes "infinite," which allows for continuous use without restriction.

Further, in a game system of an embodiment, the player can draw gacha again with payment of a cost, and obtain a new validity period for a previously-obtained game content. Since the player is given an opportunity to draw gacha again, the player selects, for the game to progress, whether to use again the game content of which the validity period has lapsed. Thus, a game that is highly strategic and is intriguing for the player can be provided. Additionally, if a game content that produces a high effect in the game is given to the player by gacha, the balance of the game can be maintained in a favorable manner by setting a validity period for a game content.

Further, in a game system of an embodiment, if the player draws gacha a predetermined number of times or more, it may be guaranteed that a game content having no validity period (i.e., having an "infinite" validity period) is associated with the player. That is, in the game system, it may be guaranteed that, if the player draws gacha the predetermined number of times or more, the player is given a game content that can be used by the player at any time. Thus, the player can obtain a game content that can be used at any time and use a desired game content for the game to progress. Accordingly, a game that is intriguing for the player can be provided. Further, the player can obtain a game content that can be used "infinitely" (i.e., a game content having an "infinite" validity period) by performing an obtaining request (gacha) the predetermined number of times or more. This gives the player a motivation for a new obtaining request (gacha).

The game content is, for example, a card associated with a player. The game content is not limited to a card. Instead, the game content may be any medium as long as it is game-related electronic data such as an object in the game associated with the player and used by the player in the game for the game to progress. The game content may be, for example, obtained, possessed, used, managed, exchanged, integrated, reinforced, sold, abandoned, or donated by the user in the game. In addition to a card, the game content includes any medium such as an item, a virtual currency, a ticket, a character, an avatar, a level, status, parameter information (health value, attack force, or the like), or competency information (skill, ability, spell, job, or the like). The game content does not have to be used in the manner explicitly described in the specification.

The types of a character and an item differ depending on material of the game. The character and the item may be anything, for example, a human, an animal, fish/shellfish, or an insect. Alternatively, the character and the item may be an automobile or an airplane. The character and the item do not have to be represented by an icon such as a human or an animal and may be represented, for example, by a symbol such as a circle or a triangle or by a letter. The character includes any one of multiple attributes. Each attribute may include a meaning related to the material of the game. The attribute may be, for example, a "fire" element, a "water" element, an "earth" element, a "wind" element, or a "light" element. The attribute may be anything as long as it is related to the material of the game. The attribute is not limited to these examples.

Description will be hereinafter made of a configuration in which an information processing device according to one aspect of the present invention functions as a mobile terminal (client device) and a program according to one aspect of the present invention is executed as a native application (native game) in the mobile terminal. The mobile terminal can access a host device (server or other mobile terminal) as necessary and download information that changes as the game progresses (for example, information related to a new version of the game or information related to other players). Further, the mobile terminal can upload, to the host device, information that changes as the game progresses. In this case, the mobile terminal can download or upload information that changes as the game progresses between the mobile terminal and the host device in real-time or at a predetermined cycle. In addition, the mobile terminal and the host device can bi-directionally exchange information that changes as the game progresses in real-time or at a predetermined cycle. Further, the game may be caused to progress in the mobile terminal if the mobile terminal cannot communicate with the host device, and bi-directional communication between the mobile terminal and the host device may be started at the point in time the mobile terminal can communicate with the host device.

FIG. 1 is a schematic diagram showing an example of the configuration of the game system according to an embodiment. The game system includes the mobile terminals 100A to 100C and the server 200. While FIG. 1 shows only three mobile terminals to facilitate explanation, there may be three or more mobile terminals.

As illustrated in FIG. 1, each of the mobile terminals 100A to 100C can communicate with the server 200 via a network 300. Further, each of the mobile terminals 100A to 100C is able to communicate with each other via the server 200. Each of the mobile terminals 100A to 100C may be able to directly communicate with each other without the server 200.

The network 300 is a communication network that provides a path in which the mobile terminals 100 are connected to the server 200 such that the mobile terminals 100 can transmit and receive data to and from the server 200. The network 300 is, for example, a wired network or a wireless network. The network 300 may be, for example, an intranet, an extranet, a virtual private network (VPN), a local area network (LAN), a wireless LAN (WLAN), a wide area network (WAN), the Internet, a mobile phone network such as long term evolution (LTE) or code division multiple access (CDMA), an integrated services digital network (ISDN), or a wireless LAN.

Hardware Configuration of Mobile Terminal 100

Figure 2:
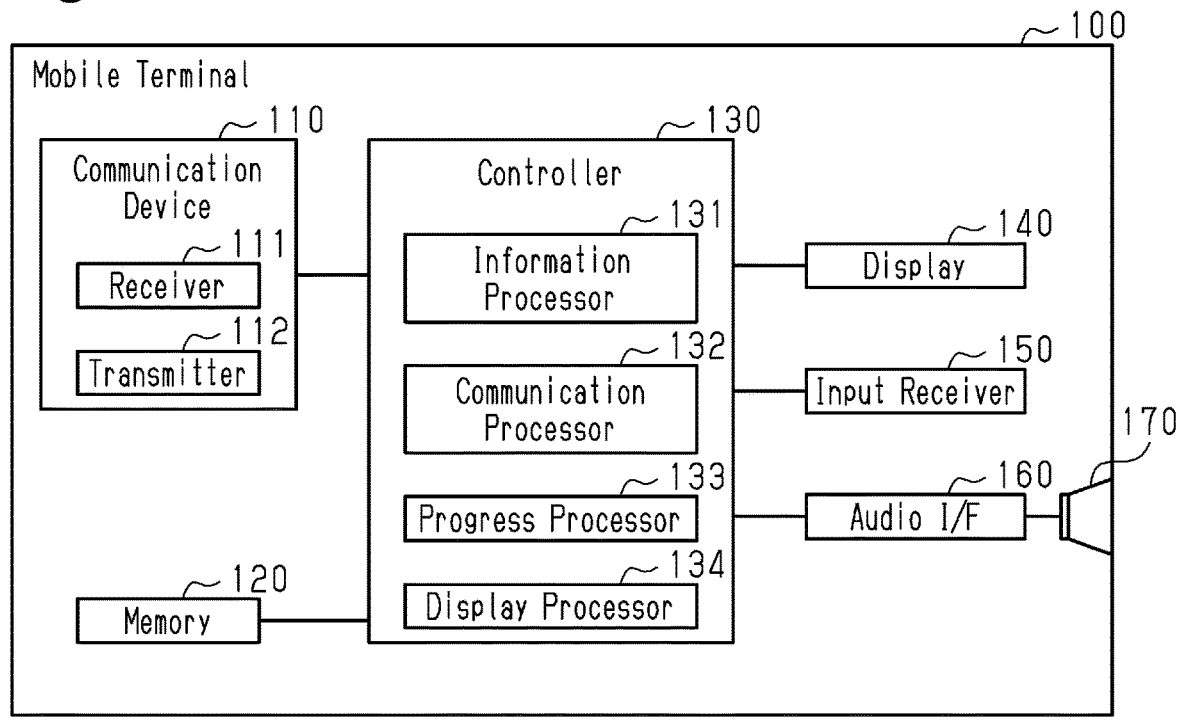
FIG. 2 is a block diagram showing an example of the mobile terminal in the embodiment.

FIG. 2 is a block diagram showing an example of the main configuration of the mobile terminal 100 according to the embodiment. The mobile terminal 100 is an information processing device capable of executing a program including the processes described below. The mobile terminal does not have to be used as long as the following processes can be executed. Instead, the mobile terminal may be, for example, a smartphone, a tablet terminal, a console, a mobile phone (feature phone), a personal computer, or other electronic devices. The program is executed in a favorable manner at a multifunction device (for example, smartphone) including a display (displaying section), an input region (input receiver) where touch inputs using a finger, a stylus, or the like can be detected, a memory, and one or more processors capable of executing one or more programs stored in the memory.

As shown in FIG. 2, the mobile terminal 100 includes a communication device 110, a memory 120, a controller 130, a display 140, an input receiver 150, an audio interface (I/F) 160, and a speaker 170.

The communication device 110 includes a receiver 111 and a transmitter 112 and functions to execute communication with the server 200 and the other mobile terminals 100B and 100C via the network 300. The communication may be wired communication or wireless communication. Additionally, as long as mutual communication can be performed, any communication protocol may be used.

The memory 120 includes a main memory having, for example, a read-only memory (ROM) and a random access memory (RAM) and includes an auxiliary memory. The auxiliary memory may be configured by, for example, a flash memory as an internal memory of the mobile terminal 100. Alternatively, the auxiliary memory may be configured by, for example, a memory card as an external memory. Further, the memory 120 may include, as the auxiliary memory, a hard disk drive (HDD), a solid state drive (SSD), or the like. The memory 120 functions to store various types of programs and data that are necessary for the mobile terminal 100 to operate. That is, the memory 120 stores information (programs and data) of a game installed in the mobile terminal 100 when, for example, the player performs downloading from the server via the network. Further, the memory 120 stores, for example, information related to game contents in the game (for example, images of the game contents, attributes, rarity, or the degree of change in parameters related to the progress of the game that is changed when associated with the player), a predetermined condition necessary for the game to progress, or information related to various conditions. The controller 130 reads and develops the programs and data stored in the ROM and the auxiliary memory, and then stores them in the RAM. That is, the RAM functions as a working memory of the controller 130 and stores, for example, temporal data used when the programs are executed.

The memory 120 stores information related to game contents in association with parameters related to the progress of the game. The display 140 is a device that displays a game view. In the present embodiment, the display 140 may be, for example, a liquid display or an organic electroluminescence (EL). In FIG. 2, the input receiver 150 and the display 140 are separated from each other to indicate their functions. However, for example, it is preferred that the input receiver 150 and the display 140 be integrated with each other if the input receiver 150 is a touch panel and the display 140 is a liquid display.

The input receiver 150 accepts an operation input performed by a player. In the present embodiment, the input receiver 150 may be a touch panel capable of detecting multi-touch, and the input receiver 150 detects a contact position where the input receiver 150 is touched by a finger of the player or a pointer (pointing device) such as a stylus, and outputs, to the controller 130, coordinate information related to the coordinates of the detected contact position. In the present embodiment, the input receiver 150 accepts, for example, an operation input (for example, touch or flick operation) performed by the player on a game content displayed on the display 140, the selection of a parameter related to the progress of the game, or a tap operation on various buttons or the like. The input receiver 150 may be a keypad or a button. Information of a key or a button pressed by the player may be output to the controller 130.

The audio I/F 160 is an interface of the speaker 170, a headphone (not shown), or an earphone (not shown). When producing sound effects, background music (BGM), or the like in a game, the controller 130 controls the audio I/F 160 so as to output sounds from the speaker 170, the headphone, or the earphone.

The controller 130 is, for example, a processor and functions to control each unit of the mobile terminal 100. The controller 130 includes an information processor 131, a communication processor 132, a progress processor 133, and a display processor 134. The controller 130 implements each process using, for example, a CPU, an integrated circuit (IC) chip, or large scale integration (LSI).

Hardware Configuration of Server

Figure 3:
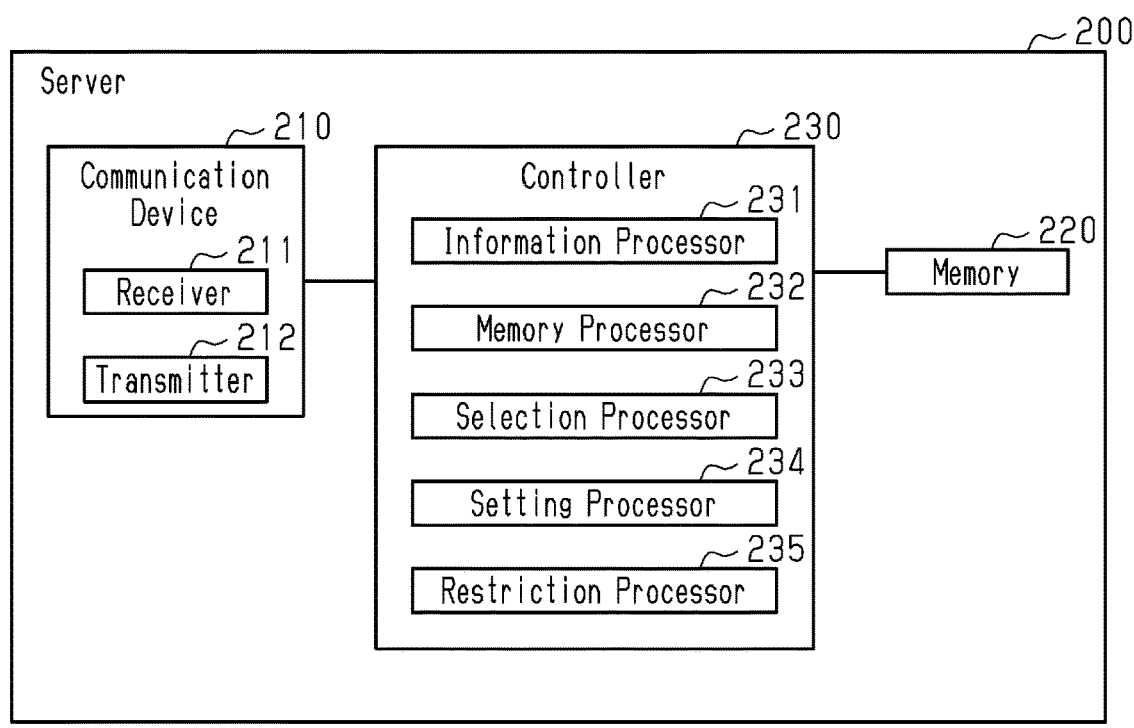
FIG. 3 is a block diagram showing an example of a server in the embodiment.

The server 200 will now be described. FIG. 3 is a block diagram showing an example of the main configuration of the server 200 according to the embodiment. As shown in FIG. 3, the server 200 includes at least a communication device 210, a memory 220, and a controller 230.

The communication device 210 includes a receiver 211 and a transmitter 212 and functions to execute communication with the mobile terminals 100A to 100C via the network 300 in accordance with instructions from the controller 230. The receiver 211 receives a message and player information that includes the progress of the game of each player. The message and the player information are transmitted from the mobile terminals 100A to 100C. The transmitter 212 transmits, to the mobile terminals 100A to 100C, another player information and a message exchanged between players.

The controller 230 is a processor that functions to control each unit of the server 200. The controller 230 includes an information processor 231, a memory processor 232, a selection processor 233, a setting processor 234, and a restriction processor 235. The controller 230 implements each process using, for example, a CPU, an integrated circuit (IC) chip, or large scale integration (LSI).

The memory 220 functions to store (hold) various types of programs and data that are necessary for the server 200 to operate. The memory 220 stores the player information of each player (for example, the progress of the game, a possessed item, an obtained game content, activity status, and the history of interaction with other players). The memory 220 includes a main memory having, for example, a read-only memory (ROM) and a random access memory (RAM) and includes an auxiliary memory. The auxiliary memory typically includes various types of recording mediums such as a hard disc drive (HDD), a solid state drive (SSD), and a flash memory. The controller 230 reads and develops the programs and data stored in the ROM and the auxiliary memory, and then stores them in the RAM, which functions as a working memory. That is, the RAM stores, for example, temporal data used when the programs are executed.

The overview of the game realized by the program according to the embodiment will now be described with reference to the drawings.

Example of Functional Configuration of Server 200

The information processor 231 of the controller 230 of the server 200 functions to transmit and receive various types of information to and from the mobile terminal 100 of a player. The information processor 231 transmits and receives, to and from the mobile terminal 100 of the player, various types of information that are necessary for the game to progress. For example, the information processor 231 transmits and receives information for the game to progress using a game content associated with the player.

The information processor 231 receives, for example, information (request signal) for requesting the execution of gacha from the mobile terminal 100 possessed by the player. If receiving a request signal, the information processor 231 notifies the selection processor 233 of the request signal. Further, the information processor 231 receives, for example, information related to the payment of a fee from the mobile terminal 100. For example, the information processor 231 transmits, to the mobile terminal 100, information related to validity periods that is set or updated for each of selected game contents.

The memory processor 232 functions to store various types of information in the memory 220. The memory processor 232 stores, for example, data related to validity periods in the memory 220. FIG. 4 shows an example of data (table) related to validity periods. The example in FIG. 4 is an example of data related to probabilities set for validity periods in a case that a player performs a first-time obtaining request (gacha).

As illustrated in FIG. 4, information related to validity periods is stored in the data related to validity periods for a card 23, which is a game content. In the data related to validity periods, a card 23 (game content) is identified using identification information with which the card 23 (game contents) can be uniquely identified. The identification information with which a game content can be uniquely identified may be, for example, a character ID or an item ID.

As illustrated in FIG. 4A, in the data related to validity periods, for each card 23, the rarity of the card 23, validity periods, and probabilities (provision probabilities) respectively set for the validity periods are associated with each other. More specifically, in the data related to validity periods, for card A, the rarity "S," the validity periods "10 hours," "20 hours," and "30 hours," and the provision probabilities for the respective validity periods "3%," "2%," and "1%" are associated with each other. In a case that the number of game content in a group to be selectively provided by gacha is defined, as illustrated in FIG. 4B, the memory 220 may store the numbers of game contents to be provided instead of the provision probabilities of the game contents. In more detail, "three" cards A having a validity period of "10 hours," "two" cards A having a validity period of "20 hours," and "one" card A having a validity period of "30 hours" may be stored as the candidates of cards associated with the player.

Further, in the data related to validity periods, for card B, the rarity "R," "10 hours," "20 hours," and "30 hours," and the provision probabilities for the respective validity periods "10%," "9%," and "8%" are associated with each other. As illustrated in FIG. 4A, the total of the probabilities associated with the game contents given in response to an obtaining request (gacha) from the player is 100%. In a case that the number of game content in a group to be selectively provided for the player by gacha is defined, the memory 220 may store, as the candidates of cards associated with the player, "10" cards B having a validity period of "10 hours," "9" cards A having a validity period of "20 hours," and "8" cards A having a validity period of "30 hours" as being accommodated in a box. When the player draws one card, the number of cards in the box decreases by one. This changes the probability of each card being selected. As illustrated in FIG. 4B, the total number of game contents included in the box is, for example, "100." The total number of game contents included in the box may be not necessarily 100. Instead, the total number of game contents included in the box may be any number.

The validity periods set for the cards 23, which are game contents, may have different lengths between the cards 23. For example, in the data related to validity periods, "10 hours," "20 hours," or "30 hours" may be set as the validity period for card A, and "20 hours," "40 hours," or "60 hours" may be set as the validity period for card B. The validity period is not limited to "10 hours," "20 hours," and "30 hours" and may include "1 day," "2 days," and "3 days," or may include "infinite" (i.e., "no validity period").

Additionally, in the data related to validity periods illustrated in FIG. 4, the provision probability differs between the validity periods. Instead, the provision probability may be the same for each validity period. For example, in a case that three validity periods ("10 hours," "20 hours," and "30 hours") are set for one game content, the provision probability of each validity period may be set to "5%" or the number of cards in the box of each validity period may be set to "5."

Further, in the data related to validity periods, the information related to validity periods may be set for each rarity of the card 23 (game content), not for each card 23 (game content). For example, in the data related to validity periods, "10 hours," "20 hours," and "30 hours" (validity periods) may be associated with rarity "S," and "3%," "2%," and "1%" may be respectively associated with the validity periods as provision probabilities. For example, in the data related to validity periods, "10 hours," "20 hours," and "30 hours" (validity periods) may be associated with rarity "R," and "10%," "9%," and "8%" may be respectively associated with those validity periods as provision probabilities. In this case, based on the data related to validity periods set for each rarity of the card 23 given to the player, the selection processor 233 sets the validity period of the card 23 given to the player.

FIG. 5 shows an example of data related to validity periods. The example in FIG. 5 is an example of the data related to probabilities set for validity periods in a case that a player performs a second-time obtaining request (gacha).

As illustrated in FIG. 5, in the data related to validity periods, for each card 23, the rarity of the card 23, validity periods, and probabilities (provision probabilities) respectively set for the validity periods are associated with each other. More specifically, in the data related to validity periods, for card A, the rarity "S," the validity periods "10 hours," "20 hours," and "30 hours," and the provision probabilities for those validity periods "4%," "3%," and "2%" are associated with each other.

Further, in the data related to validity periods, for card B, the rarity "R," "10 hours," "20 hours," and "30 hours," the provision probabilities for the validity periods and "9%," "8%," and "7%" are associated with each other. In this manner, in the data related to validity periods, the provision probability that is set in a case that the player performs a second-time obtaining request (gacha) may differ from the provision probability that is set in a case that the player performs the first-time obtaining request (gacha), which is illustrated in FIG. 4A. The probability is greater than or equal to "0%" and less than or equal to "100%." In a case in which the number of game content in a group to be selectively provided by the player through gacha is defined as illustrated in FIG. 4B, after a predetermined number of cards (for example, four cards) are drawn from the box, one or more high-value game contents (for example, game contents having an "infinite" validity period) may be added to the box.

FIGS. 4 and 5 are examples of the data related to the validity periods of first-time and second-time obtaining requests (gachas). The memory 220 may store data related to the validity periods of third-time and subsequent obtaining requests (gachas). That is, the data related to validity periods is stored for each of the numbers of times the player performs an obtaining request (gacha), and the validity period of a card given to the player is set based on the number of times of the obtaining request (gacha).

As described above, the memory processor 232 causes validity periods that differ in number and length to be stored in association with game contents each having different identification information. The selection processor 233 has a function to select a game content given to the player if an obtaining request (gacha) for a game content is received from a player. If an obtaining request (gacha) for a game content is received from a player, the selection processor 233 performs calculation for selecting a game content from a plurality of game contents in accordance with a predetermined rule and selects a set of, or a predetermined number of, game contents. Further, if an obtaining request (gacha) for a game content is received from a player, the selection processor 233 may select a set of, or a predetermined number of, game contents from a plurality of game contents in accordance with a predetermined order.

If an obtaining request for a game content is received from a player, the selection processor 233 selects the predetermined number of game contents based on the data related to validity periods stored in the memory 220. The predetermined number may be a number that has been set in advance (fixed number) or a number that changes each time an obtaining request (gacha) is received. The predetermined number may be set within, for example, a range of "1 to 10." The predetermined number may include "0." In this case, the selection processor 233 selects no game content.

For example, the selection processor 233 selects the predetermined number of (for example, two) cards 23, which are game contents given to the player, in accordance with the probabilities set for the validity periods of game contents. For example, the selection processor 233 gives, to the player, card A of which the validity period is set to "10 hours" and card B of which the validity period is set to "30 hours" in accordance with the probabilities associated with the validity periods illustrated in FIG. 4A. The selection processor 233 may select a predetermined number of game contents for each rarity.

Additionally, for example, if the number of game contents to be provided is stored instead of the provision probability of a game content selected by gacha, the predetermined number of (for example, two) cards 23, which are game contents given to the player, are selected from a group of game contents including game contents, the number of which is set for each validity period. For example, the selection processor 233 gives, to the player, card A of which the validity period is set to "10 hours" and card B of which the validity period is set to "30 hours" from the card group associated with the validity periods illustrated in FIG. 4B. The selection processor 233 may select a predetermined number of game contents for each rarity.

As described above, the selection processor 233 can differentiate the provision probabilities between game contents each having different identification information (i.e., card A and card B) and associated with the same validity period (i.e., card A of which the validity period is "10 hours" and card B of which the validity period is "10 hours"). That is, different provision probabilities may be set for game contents associated with the same validity period.

Further, for example, the selection processor 233 selects the predetermined number of game contents based on a provision probability that changes as the number of times of the obtaining request increases. For example, for a first-time obtaining request, the selection processor 233 selects the card 23 (a game content given to the player) based on the data related to validity periods illustrated in FIG. 4A. Further, for example, for a second-time obtaining request, the selection processor 233 selects the card 23 (a game content given to the player) based on the data related to validity periods illustrated in FIG. 5, which differs from the data related to validity periods illustrated in FIG. 4 in the first-time obtaining request.

For the second-time obtaining request, the selection processor 233 selects the predetermined number of (for example, two) cards 23, which are game contents given to the player, in accordance with the probabilities associated with the validity periods illustrated in FIG. 5. For example, the selection processor 233 gives, to the player, card A of which the validity period is set to "30 hours" and card B of which the validity period is set to "20 hours" in accordance with the probabilities associated with the validity periods illustrated in FIG. 5.

In the second-time obtaining request, the selection processor 233 may select the predetermined number of (for example, two) cards 23, which are game contents given to the player, in accordance with the probabilities associated with the validity periods illustrated in FIG. 5. The selection processor 233 may select a predetermined number of game contents for each rarity.

The predetermined number may be set for each rarity. For example, the selection processor 233 may select a predetermined number of (for example, "1") game contents from the game contents of which the rarity is "S." For example, the selection processor 233 may select a predetermined number of (for example, "2") game contents from the game contents of which the rarity is "R."

As described above, in a single selection of the game content, the selection processor 233 selects a game content provided for the player from game contents having validity periods for which different provision probabilities are set. In a single selection of the game content, the selection processor 233 may select game contents provided for the player from game contents associated having validity periods for which the same provision probability is set. For example, three validity periods, namely, "10 hours," "20 hours," and "30 hours," may be set for one game content, and the provision probability of "10%" may be set for each game content.

Further, if an obtaining request is received from the player a predetermined number of times or more, the selection processor 233 may guarantee that the player is given a game content that can be used at any time (i.e., a game content having an "infinite" validity period). For example, if the player draws a fourth-time gacha, which is the predetermined number of times, the selection processor 233 may associate, with the player, a game content that can be used at any time (i.e., a game content having an "infinite" validity period). For example, in the fourth-time obtaining request, the selection processor 233 may give the player two cards (predetermined number of cards) as game contents having an "infinite" validity period. At this time, even if the player obtains a game content having an "infinite" validity period in the first time to the third time, a game content having an "infinite" validity period may be given in the fourth-time gacha. Further, if a card obtained in the first-time to third-time gachas and having a validity period that is not "infinite" is associated with the player, a card that is the same type as that card and has an "infinite" validity period may be obtained in the fourth-time gacha. For example, if card A, card B, card C, . . . , having a validity period that is not "infinite" are obtained in the first-time to third-time gachas, cards that are the same type as the predetermined number of these cards (for example, card A and card C) and have an "infinite" validity period may be associated with the player in the fourth-time gacha. Alternatively, if a card having an "infinite" validity period is not associated with the player in the first-time to third-time gachas, a card having an "infinite" validity period may be given in the fourth-time gacha. As another option, if a card having an "infinite" validity period is associated with the player in the first-time to third-time gachas, a different card having an "infinite" validity period may be given in the fourth-time gacha. In short, while gacha is drawn the predetermined number of times, at least one or more cards having an "infinite" validity period simply needs to be obtained. The predetermined number of times does not have to be four and may be any number of times. The predetermined number does not have to be two. As long as the predetermined number is one or more, it may be any number.

For example, if the player draws gacha a predetermined number of times, the selection processor 233 may guarantee that a predetermined number of game contents having an "infinite" validity period is given to the player for each rarity (for example, one game content for each rarity). In this case, the selection processor 233 may set, for each rarity, a predetermined number of times of obtaining requests (gachas) for the player to be given a card having an "infinite" validity period. For example, for a card of which the rarity is "S," the setting is made such that the player can obtain the card of which the rarity is "S" and which has an "infinite" validity period by performing an obtaining request (gacha) ten times. For a card of which the rarity is "R," the setting is made such that the player can obtain the card of which the rarity is "R" and which has an "infinite" validity period by performing an obtaining request (gacha) four times.

Thus, by performing an obtaining request (gacha) the predetermined number of times, the player can obtain a game content that can be used "infinitely." This motivates the player to perform a new obtaining request (gacha).

If an obtaining request is received from the player, the selection processor 233 requests a fee from the player. For example, if the player performs a first-time obtaining request, the selection processor 233 requests "100C (coin)" as the fee. The fee may be anything. The fee is a predetermined parameter (game content) associated with the player, such as a "coin (C)" usable in the game. The selection processor 233 does not have to request any fees from the player for the initial, first obtaining request (gacha).

The selection processor 233 may increase the fee as the number of times of the obtaining request increases. For example, if the player performs a second-time obtaining request, the selection processor 233 requests "300C" as the fee. Further, for example, if the player performs a third-time obtaining request, the selection processor 233 requests "500C" as the fee. Further, for example, if the player performs a fourth-time obtaining request, the selection processor 233 requests "1000C" as the fee. The fees requested by the selection processor 233 are just examples and may have any amount. Further, the fee does not have to be requested by the selection processor 233 four times (stages or steps) and may be requested any number of times (stages or steps).

The selection processor 233 may accept an obtaining request (gacha) from the player during the occurrence of a predetermined event (game event), i.e., during a period in which the obtaining request can be performed, and determine the fee requested from the player based on the remaining time until the event ends. For example, if the remaining time is short, the selection processor 233 decreases the fee requested from the player. If the remaining time is long, the selection processor 233 increases the fee requested from the player. For example, if the remaining time until the predetermined event ends is "3 days," the selection processor 233 sets the fee requested from the player to a fee that is 1.5 times larger than a standard fee. If the remaining time until the predetermined event ends is "1 day," the selection processor 233 sets the fee requested from the player to a fee that is 0.5 times larger than the standard fee. The selection processor 233 may decrease the fee if the remaining time is long and increase the fee if the remaining time is short.

The setting processor 234 obtains the validity period associated with the game content selected by the selection processor 233 and sets the obtained validity period as the validity period of the game content. For example, the setting processor 234 sets a validity period for each of the game contents selected by the selection processor 233 based on the data related to the validity periods stored in the memory 220.

Further, the selection processor 233 sets a validity period for the game content given to a player based on the data related to the validity periods set based on the number of obtaining requests (gachas) performed by the player.

If the player performs a first-time obtaining request (gacha), the setting processor 234 refers to the data related to validity periods illustrated in FIG. 4A and sets a validity period for each of the game contents selected by the selection processor 233. For example, if card A of which the validity period is "10 hours" is given to the player, the selection processor 233 sets the validity period of card A given to the player to "10 hours."

If the player performs a second-time obtaining request (gacha), the setting processor 234 refers to the data related to validity periods illustrated in FIG. 5 and sets a validity period for each of the game contents given to the player. For example, if card A of which the validity period is "20 hours" is given to the player, the selection processor 233 sets the validity period of card A given to the player to "20 hours."

The setting processor 234 has a function to obtain the validity period associated with a selected game content and, if there is a game content, which has the same identification information as the selected game content, among the game contents associated with the player, to update the validity period of that game content based on the obtained validity period.

Figure 6:
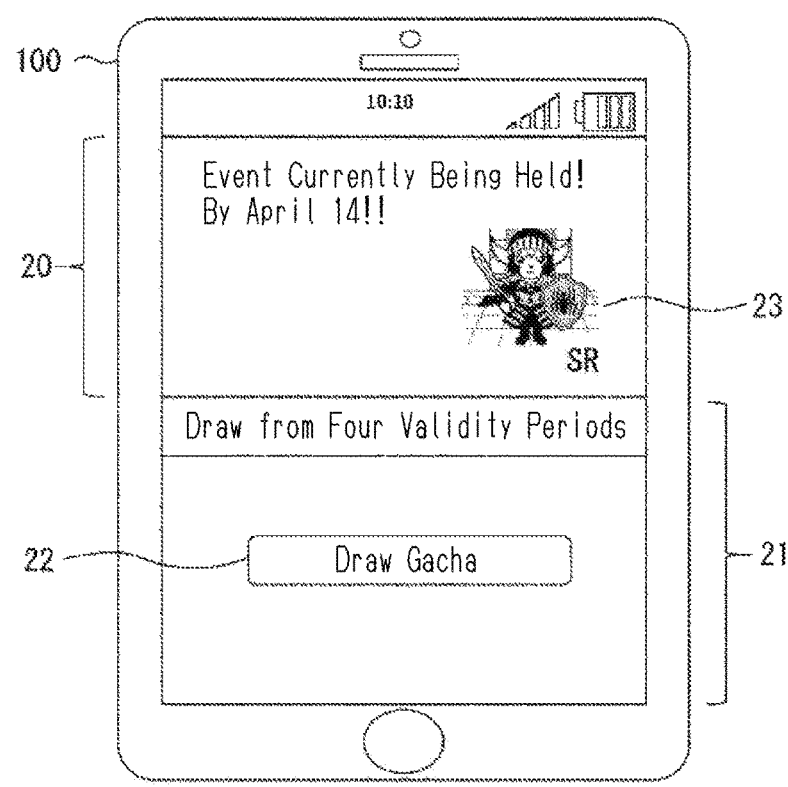
FIG. 6 is a schematic diagram of a screen view that is displayed on a display of a mobile terminal in the embodiment.

For example, if the player performs a second-time obtaining request (gacha), the setting processor 234 sets the validity period of card A given to the player to "20 hours" based on the data related to validity periods illustrated in FIG. 6. Here, in a case in which a game content having the same identification information as a game content selected if an obtaining request (gacha) is performed is already associated with the player (i.e., in a case in which the player already possesses the game content having the same identification information), the setting processor 234 updates the validity period of the game content based on the obtained validity period. For example, if card A is already given to the player by the first-time obtaining request (gacha), the setting processor 234 updates the validity period of card A given to the player based on card A of "20 hours" selected by the second-time obtaining request (gacha). The setting processor 234 adds "20 hours," which is the validity period of card A selected in the second-time obtaining request (gacha), to the remaining validity period of card A that is already associated with the player. For example, if the remaining validity period of card A already associated with the player is "5 hours," the setting processor 234 adds, to that validity period of the card A, "20 hours" (the validity period of card A selected in the second-time obtaining request (gacha)), thereby setting the validity period of the card A to "25 hours." The setting processor 234 may update the validity period of the game content using a validity period that differs from the validity period obtained through a simple addition. For example, if the remaining validity period of card A already associated with the player is "5 hours," the setting processor 234 may set the validity period of the card A to "30 hours" instead of "25 hours."

If an obtaining request is received from the player the predetermined number of times or more, the setting processor 234 may set "infinite" as the validity period for the game content selected by the selection processor 233. For example, in a fourth-time obtaining request, the setting processor 234 may set "infinite" as the validity periods for two cards (predetermined number of cards), namely, card A and card B. For example, if the player draws gacha the predetermined number of times or more, the setting processor 234 may set "infinite" as the validity period for the game content selected for each rarity.

In this manner, if an obtaining request (gacha) is received from the player the predetermined number of times or more, the validity period of a game content associated with the player is set to "infinite." This allows the player to use the game content at any time. That is, the player can obtain a game content that can be used "infinitely" by performing an obtaining request (gacha) the predetermined number of times or more. This motivates the player to perform a new obtaining request (gacha).

The restriction processor 235 has a function to restrict the use of a game content associated with a player in the game if the validity period of the game content lapses. The restriction processor 235 transmits, to the mobile terminal 100, restriction information for restricting the use of a game content of which the validity period has lapsed. Instead of restricting the use of a game content, the restriction processor 235 may restrict the skills or parameters of the game content. For example, if the validity period of the game content associated with the player lapses, the restriction processor 235 may limit the parameters of the game content to be low or may restrict the use of a predetermined skill of the skills set for the game content. Alternatively, instead of restricting the use of a game content, the restriction processor 235 may limit game parts that can be executed using the game content. For example, if the validity period of the game content associated with the player lapses, the restriction processor 235 may limit the use of the game content to a predetermined quest and prevent the game content from being used in quests other than the predetermined quest. As another option, instead of restricting the use of a game content, the restriction processor 235 may restrict the player's action that can be executed for the game content. For example, if the validity period of the game content associated with the player lapses, the restriction processor 235 may prevent the game content from being leveled up (raised) while allowing the game content to be used for a quest.

Example of Functional Configuration of Mobile Terminal 100

The information processor 131 of the mobile terminal 100 has a function to accept various inputs from the player via the input receiver 150. For example, the information processor 131 accepts an obtaining request (gacha) from the player. Further, the information processor 131 accepts information related to fee payment executed by the player via the input receiver 150.

The communication processor 132 has a function to transmit and receive various types of information to and from the server 200. For example, the communication processor 132 transmits an obtaining request (gacha) to the server 200. The communication processor 132 receives a request for the fee from the server 200. Further, the communication processor 132 transmits the information related to the fee payment to the server 200. Furthermore, the communication processor 132 receives information related to the validity periods set or updated for each of the selected game contents.

The progress processor 133 of the mobile terminal 100 functions to cause the game to progress. For example, the progress processor 133 causes the game to progress using a game content associated with the player. For example, the progress processor 133 causes the game to progress based on the information that is received from the server 200 and related to a game content associated with the player. For example, the progress processor 133 restricts the use of the game content based on the restriction information, which is received from the server 200, for restricting the use of a game content.

The display processor 134 of the mobile terminal 100 functions to convert, into pixel information, data for display that is output from the information processor 131 or other functional units and outputs the pixel information to the display 140.

Examples of Screen View

FIG. 6 is a schematic diagram showing an example of a screen view that is displayed on the input receiver of the mobile terminal 100 of the embodiment. FIG. 6 is an example of the screen view displayed if the player performs an obtaining request (for example, gacha) for a game content.

As illustrated in FIG. 6, the display 140 of the mobile terminal 100 displays a region 20, which indicates that gacha can be drawn during the current period. The region 20 shows "Event Currently Being Held" as the information indicating that gacha can be drawn during the current period. The region 20 also shows information related to the end of the event, "By April 14!!", as the information related to the period during which a predetermined gacha can be drawn. The region 20 may also show information related to game contents likely to be gained by obtaining requests (gachas). In the example of FIG. 6, the region 20 shows the card 23 as the game content that is likely to be gained by drawing gacha. The information displayed in the region 20 is not limited to these examples. Any information may be included as long as it indicates that gacha can be drawn.

As illustrated in FIG. 6, the display 140 of the mobile terminal 100 displays a region 21, which shows information for the player to perform an obtaining request (gacha). The region 21 includes an icon 22, which can be selected by the player via the input receiver 150, as the information for the player to perform an obtaining request. The player performs an obtaining request (gacha) for a game content by selecting the icon 22.

In the embodiment, a validity period is set for a game content obtained by the player through an obtaining request (gacha). During the validity period, the player can use the game content in a game. For example, four types of validity periods can be set for one game content. The validity periods include four types, for example, one hour, two hours, three hours, and infinite. The validity periods are not limited to these examples and may be any period (duration). The number of types of validity periods set for one game content is not limited to four. Instead, any number of types of validity period may be set for one game content.

When the player performs an obtaining request (gacha), the player is given any one of game contents. Also, a validity period is set for the game content given to the player.

Figure 7:
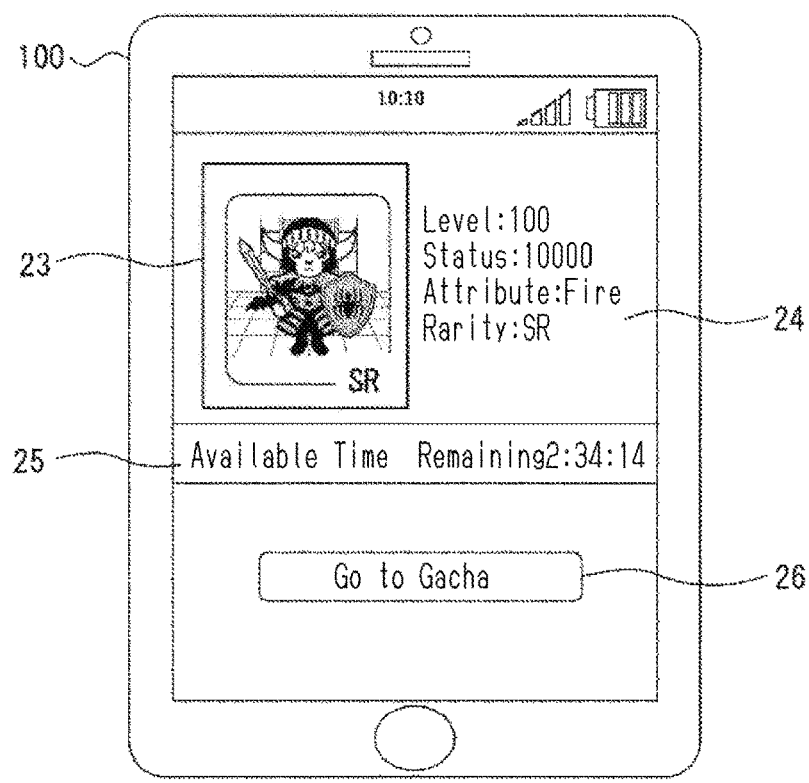
FIG. 7 is another schematic diagram of a screen view that is displayed on the display of the mobile terminal in the embodiment.

FIG. 7 is a schematic diagram showing an example of a screen view that is displayed on the display 140 of the mobile terminal 100 of the embodiment. FIG. 7 is an example of the screen view that displays a game content given to the player in a case that the player performs an obtaining request (gacha).

As illustrated in FIG. 7, the display 140 of the mobile terminal 100 displays the card 23, which is a game content given if the player performs an obtaining request (gacha). The card 23 includes, for example, a character or an item. The card 23 may include indication related to the rarity of a character or an item. In the example of FIG. 7, the card 23 may include indication of the rarity "SR" together with a character. The card 23 may include any information as long as it is related to the card 23.

Further, the display 140 of the mobile terminal 100 may display various parameters 24 of the card 23. The various parameters 24 of the card 23 are, for example, information such as the status, attribute, or rarity of the card 23. In the example of FIG. 7, "100" is displayed as the level of the card 23, "10000" is displayed as the status, "fire" is displayed as the attribute, and "SR" is displayed as the rarity.

In addition, the display 140 of the mobile terminal 100 may include time information 25, which is related to the validity period of the card 23 given to the player. The time information 25 indicates the time (available time) during which the player can use the card 23 in the game. The available time is, for example, the remaining time until the card 23 becomes unavailable. In the example of FIG. 7, the time information 25 displays "2:34:14" as the remaining time of the card. The time information 25 may be any content as long as it indicates that the player can use the card 23 in the game. For example, the time information 25 may be time elapsed from the beginning of the use.

Further, the display 140 of the mobile terminal 100 displays an icon 26 for the player as information for performing an obtaining request (gacha) for a game content. The player can cause the screen view to shift to a screen view to perform an obtaining request (gacha) for a game content by selecting the icon 26. If the available time has lapsed or remains, the player can perform an obtaining request (gacha) for a game content again by selecting the icon 26.

Figure 8:
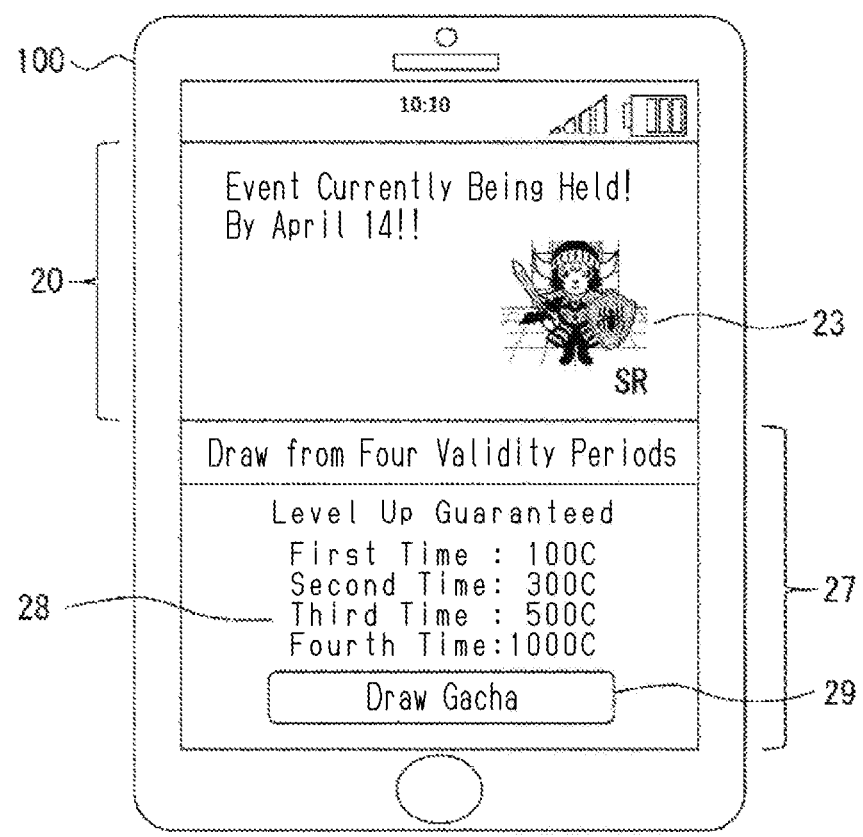
FIG. 8 is a further schematic diagram of a screen view that is displayed on the display of the mobile terminal in the embodiment.

FIG. 8 is a schematic diagram showing an example of a screen view that is displayed on the input receiver of the mobile terminal 100 of the embodiment. FIG. 8 is an example of the screen view displayed in a case that the player performs an obtaining request (gacha) for a game content again.

As illustrated in FIG. 8, the display 140 of the mobile terminal 100 displays the region 20, which indicates that an obtaining request (gacha) can be performed during the current period. The region 20 shows "Event Currently Being Held" as the information indicating that an obtaining request (gacha) can be performed during the current period. The region 20 also shows information related to the end of the event, "By April 14!!", as the information related to the period during which gacha can be drawn. The region 20 may also show information related to game contents likely to be gained by obtaining requests (gachas). In the example of FIG. 8, the region 20 shows the card 23 as the game content that is likely to be gained by performing an obtaining request (gacha). The information displayed in the region 20 is not limited to these examples. Any information may be included as long as it indicates that an obtaining request (gacha) can be performed.

Further, the display 140 of the mobile terminal 100 displays a region 27, which shows information for the player to perform an obtaining request (gacha). The region 27 includes an icon 29, which can be selected by the player via the input receiver 150, as the information for the player to perform an obtaining request. The player performs an obtaining request (gacha) for a game content by selecting the icon 29.

Further, the region 27 includes fee information 28, which is related to the fee that is necessary if the player performs an obtaining request (gacha) for a game content. For example, the region 27 shows, as the fee information 28, information related to necessary predetermined parameters (coins in the illustration of FIG. 8) that respectively correspond to multiple stages (steps). In the example of FIG. 8, for example, the number of coins necessary for each of four stages (steps) is displayed as the fee information 28. More specifically, "first time: 100C," "second time: 300C," "third time: 500C," and "fourth time: 1000C" are displayed as the fee information. Further, in association with this fee information, the content guaranteed in each time may be described. For example, the fact that a card having an "indefinite" validity period can be obtained in a fourth-time gacha may be displayed. Alternatively, the attribute of a card that can be obtained at the second or third time may be displayed. These are just examples. Instead, the fee information 28 may include any information as long as it is related to the fee that is necessary if the player performs an obtaining request (gacha) for a game content.

Operation Example of Game System

Figure 9:
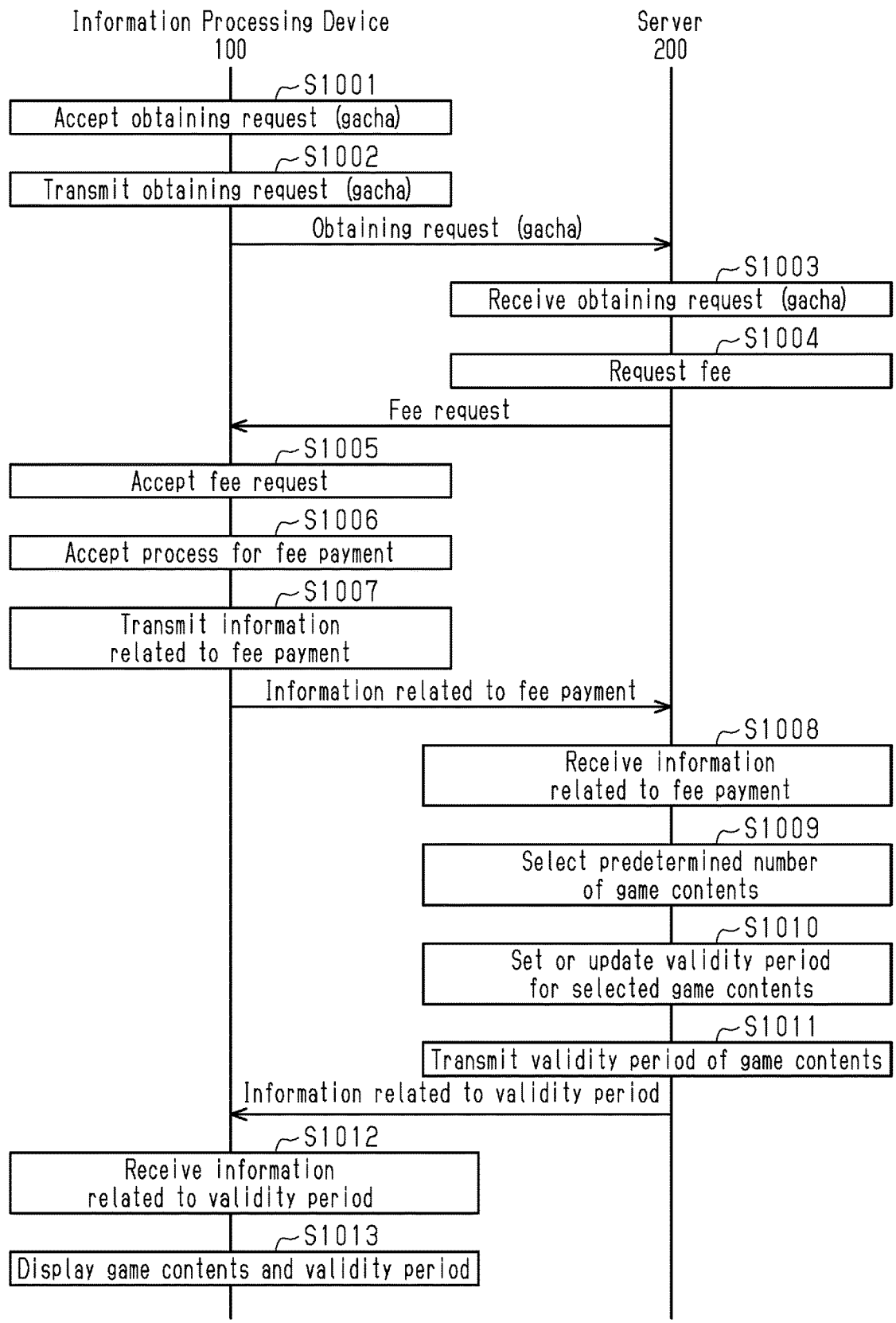
FIG. 9 is a sequence chart illustrating the process of the game in the embodiment.

FIG. 9 is a sequence chart illustrating an operation example of the game system in the embodiment.

As illustrated in FIG. 9, the information processor 131 of the mobile terminal 100 accepts an obtaining request (gacha) from the player (S1001). Subsequently, the communication processor 132 transmits the obtaining request (gacha) to the server 200 (S1002).

The information processor 231 of the server 200 receives the obtaining request (gacha) (S1003). The selection processor 233 requests a fee from the player based on the number of times of the obtaining request from the player (S1004). If the number of times of the obtaining request from the player is the first time, the selection processor 233 may not request a fee.

The communication processor 132 of the mobile terminal 100 receives the request for the fee (S1005). The information processor 131 accepts information related to the fee payment performed by the player via the input receiver 150 (S1006). Subsequently, the communication processor 132 transmits the information related to the fee payment to the server 200 (S1007).

The information processor 231 of the server 200 receives the information related to the fee payment from the mobile terminal 100 (S1008). In a case that the selection processor 233 does not request the fee, S1004 to S1008 are omitted.

Then, the selection processor 233 of the server 200 selects a predetermined number of game contents from multiple game contents (S1009). The setting processor 234 obtains a validity period associated with the game content that has been selected by the selection processor 233 and sets the validity period for the game content (S1010). If there is a game content having the same identification information as the selected game content among the game contents associated with the player, the setting processor 234 may update the validity period of that game content based on the obtained validity period (S1010). The setting processor 234 transmits, to the mobile terminal 100 via the information processor 231, the information related to the validity period set or updated for each of the selected game contents (S1011).

The communication processor 132 of the mobile terminal 100 receives the information related to the validity period that has been set or updated for each of the selected game contents (S1012). The display processor 134 causes the display 140 to display the selected game content together with the set or updated validity period (S1013).

As described above, in the game system of the embodiment, a validity period is set for a game content. Thus, even in a case in which the player has been provided with a game content, the rareness or value of the game content can be maintained. Additionally, in the game system of the embodiment, the game content has time-related properties. This provides the player with a method for obtaining a wide variety of game contents without excessively increasing the processing load of the mobile terminals 100 and the server 200 and the amount of data.

Modifications

In a modification of the embodiment, the available time of a specific game content can be extended or updated (or newly given) by the player performing an obtaining request (gacha). The example of the configuration of the mobile terminal 100 and the server 200 is the same as the example shown in FIGS. 2 and 3. Thus, the configuration will not be described in detail.

The selection processor 233 of the server 200 refers to data related to validity periods stored in the memory 220 to select one of multiple validity periods that can be selected for a specific game content. For example, if the player performs a second-time obtaining request (gacha), the selection processor 233, based on the data related to the validity periods, selects one of the validity periods "10 hours," "20 hours," and "30 hours" that can be selected for card A, which is a game content, as the validity period for card A based on the probability of each validity period being selected. For example, the selection processor 233 selects, as a new validity period of card A, "10 hours" at the probability of "62%," "20 hours" at the probability of "32%," and "30 hours" at the probability of "6%."

The setting processor 234 sets the validity period selected by the selection processor 233 as the validity period of the specific game content. For example, the setting processor 234 extends or updates the validity period of the game content A based on "30 hours" selected by the selection processor 233.

If an obtaining request for a specific game content is received from the player a predetermined number of times or more, the selection processor 233 may select "indefinite" as the validity period of the specific game content. For example, if the player draws gacha four times (predetermined number of times) or more, the selection processor 233 may select "indefinite" as the validity period of the specific game content.

Further, if an obtaining request is received from the player the predetermined number of times or more, the setting processor 234 may set "indefinite" as the validity period for the specific game content. For example, for a fourth-time obtaining request, the setting processor 234 sets "indefinite" as the validity period for the specific game content.

Thus, if the player performed the obtaining request (gacha) a predetermined number of times or more, the validity period of a specific game content is set to "indefinite." This motivates the player to perform a new obtaining request (gacha).

Figure 10:
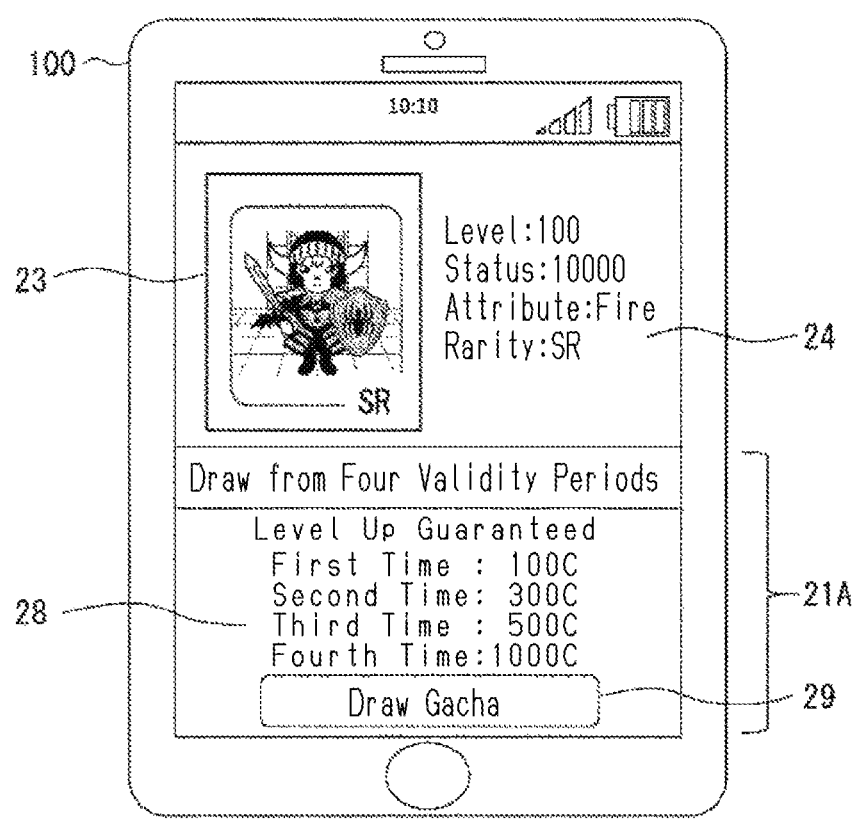
FIG. 10 is further schematic diagram of a screen view that is displayed on the display of the mobile terminal in a modification of the embodiment.

FIG. 10 is a schematic diagram showing another example of a screen view that is displayed on the display 140 of the mobile terminal 100 of the modification of the embodiment. As illustrated in FIG. 10, the display 140 of the mobile terminal 100 displays the card 23, which is a game content associated with the player. The card 23 includes, for example, a character or an item. The card 23 may include indication related to the rarity of a character or an item. In the example of FIG. 10, the card 23 may include indication of the rarity "SR" together with a character. The card 23 may include any information as long as it is related to the card 23.

Further, the display 140 of the mobile terminal 100 may display the various parameters 24 of the card 23. The various parameters 24 of the card 23 are, for example, information such as the level, status, attribute, or rarity of the card 23. In the example of FIG. 10, "100" is displayed as the level of the card 23, "10000" is displayed as the status, "fire" is displayed as the attribute, and "SR" is displayed as the rarity.

As illustrated in FIG. 10, the display 140 of the mobile terminal 100 displays a region 21A, which shows the information for the player to perform an obtaining request (gacha). In the example of FIG. 10, the player performs an obtaining request (gacha) in order to extend the validity period of the card 23 that is being displayed or update the validity period of the card 23 (assign a new validity period of the card 23). The region 21A includes the icon 29, which can be selected by the player via the input receiver 150, as the information for the player to perform an obtaining request. The player performs an obtaining request (gacha) for a game content by selecting the icon 29.

Further, the region 21A includes fee information 28, which is related to the fee that is necessary in a case that the player performs an obtaining request (gacha) for a game content. For example, the region 27 shows, as the fee information 28, information related to necessary predetermined parameters (coins in the illustration of FIG. 10) that respectively correspond to multiple stages (steps). In the example of FIG. 10, for example, the number of coins necessary for each of four stages (steps) is displayed as the fee information 28. More specifically, "first time: 100C," "second time: 300C," "third time: 500C," and "fourth time: 1000C" are displayed as the fee information. These are just examples. Instead, the fee information 28 may include any information as long as it is related to the fee that is necessary in a case that the player performs an obtaining request (gacha) for a game content.

Figure 11:
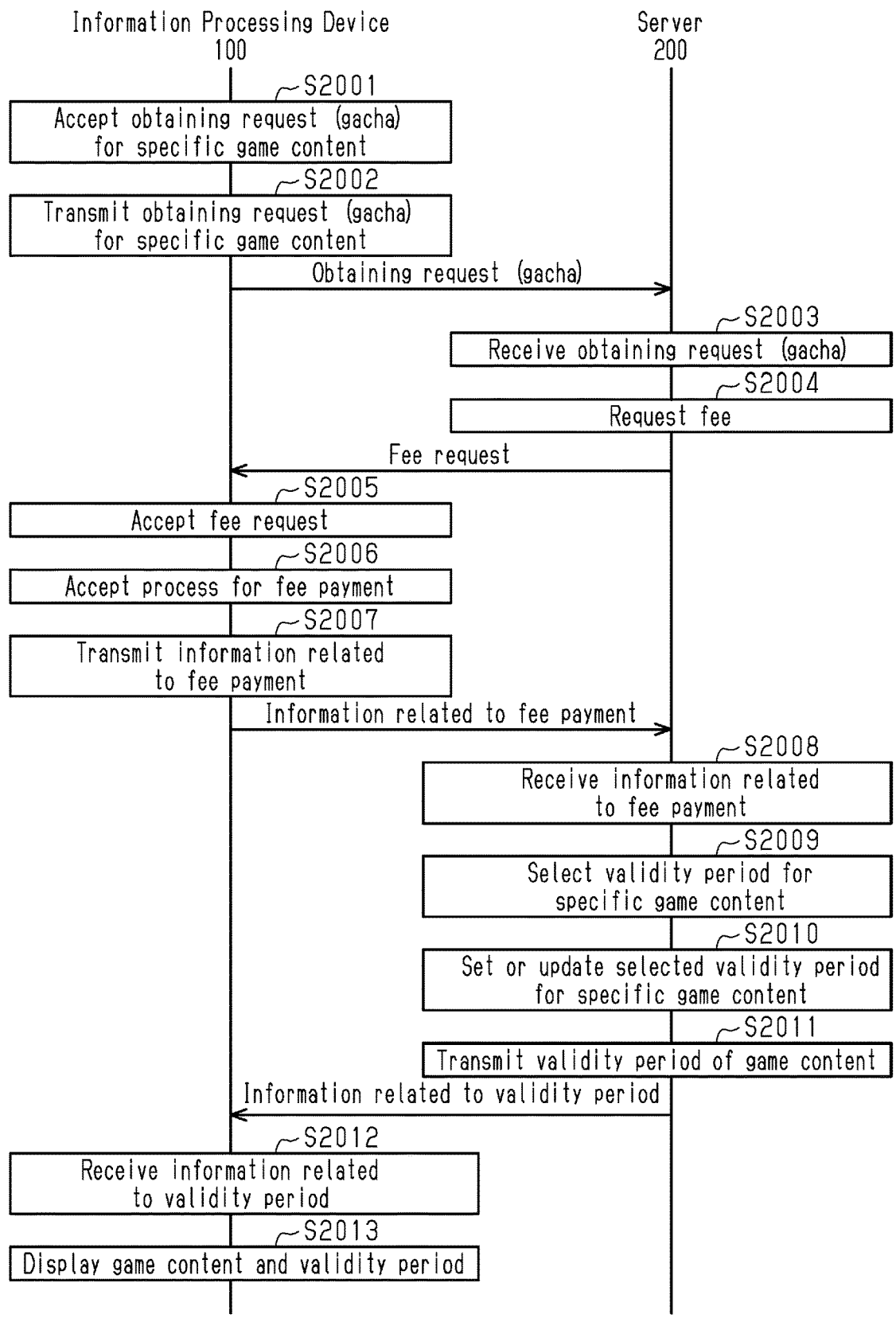
FIG. 11 is a sequence chart illustrating the process of the game in the modification of the embodiment.

FIG. 11 is a sequence chart illustrating an operation example of the game system in the modification of the embodiment. As illustrated in FIG. 11, the information processor 131 of the mobile terminal 100 accepts an obtaining request (gacha) for a specific game content from the player (S2001). Subsequently, the communication processor 132 transmits the obtaining request (gacha) to the server 200 (S2002).

The information processor 231 of the server 200 receives the obtaining request (gacha) (S2003). The selection processor 233 requests a fee from the player based on the number of times of the obtaining request from the player (S2004).

The communication processor 132 of the mobile terminal 100 receives the request for the fee (S2005). The information processor 131 accepts information related to the fee payment executed by the player via the input receiver 150 (S2006). Subsequently, the communication processor 132 transmits the information related to the fee payment to the server 200 (S2007).

The information processor 231 of the server 200 receives the information related to the fee payment from the mobile terminal 100 (S2008). Subsequently, the selection processor 233 of the server 200 refers to the memory 220 to select one of multiple validity periods that can be selected for the specific game content (S2009). The setting processor 234 obtains the validity period selected by the selection processor 233 and sets the validity period for the game content (S2010). The setting processor 234 transmits, to the mobile terminal 100 via the information processor 231, the information related to the validity period extended or updated for the specific game content (S2011).

The communication processor 132 of the mobile terminal 100 receives information related to the validity period that has been extended or updated for the specific game content (S2012). The display processor 134 causes the display 140 to display the specific game content together with the validity period that has been extended or updated (S2013).

As described above, in the game system of the embodiment, the available time of a specific game content can be extended or updated (newly added) by the player performing an obtaining request (gacha). Thus, the player causes the game to progress by selecting whether to use the game content again. Accordingly, a game that is highly strategic and is intriguing for the player can be provided. Further, the player can set "indefinite" as the validity period for the specific game content by performing an obtaining request (gacha) the predetermined number of times or more. This motivates the player to perform a new obtaining request (gacha). In addition, in the game system of the embodiment, the game content has time-related properties. This provides the player with a method for obtaining a wide variety of game contents without excessively increasing the processing load of the mobile terminals 100 and the server 200 and the amount of data.

In the foregoing description, the information processing device according to one aspect of the present invention functions as a mobile terminal (client device) and the program according to one aspect of the present invention is executed as a native application (native game) in the mobile terminal. However, the present invention is not limited to this configuration. Instead, the information processing device according to one aspect of the present invention may function as a server. Further, the program according to one aspect of the present invention may be partly or entirely executed as a web application (web game) in the server, and the result of the executed process may be returned to the mobile terminal.

In the above-described embodiment, an information processing device 200', which is a server device, may include part of or all of the units (in particular, the controller 130) of the information processing device 100, which is a mobile terminal. Further, the information processing device 200' may be able to transmit the output result of the game to the mobile terminal 100 based on inputs given to the mobile terminal 100. Thus, the information processing device 200' provides the same effect as the effect produced by the mobile terminal 100 in a case that the mobile terminal 100 provides the functions.

In a case that the result of the game is displayed via a web browser, the mobile terminal 100 can accumulate information received from the server 200' in, for example, a predetermined memory area (web storage) by the web browser.

The game may be a hybrid game in which the information processing device 200' and the mobile terminal 100 command part of the processes. More specifically, for example, the game view may be displayed by the web browser on the mobile terminal 100 based on the data generated by the information processing device 200', and other menu views or the like may be displayed by a native application installed in the mobile terminal 100.

Even if the game program according to the present invention is achieved as a native application executed on the mobile terminal 100, the mobile terminal 100 can access the information processing device 200' as necessary to download and use information related to the progress of the game (for example, information related to a player, information related to other players who are in a friend relationship with the player, information related to accumulated points, items, and characters associated with the player, or ranking information of the player). Further, mobile terminals may be communicably connected to each other (for example, peer-to-peer communication such as near-field communication using Bluetooth (registered trademark)) such that the mobile terminals synchronize with each other and multiple players play the game in a multi-play way.

The above-described methods may include not only the processes described with reference to the flowcharts but also a process executed by each unit of the controller 130. The mobile terminal 100 is not limited to a smartphone as shown in the figure. The mobile terminal may be any device as long as it is an information processing device that can achieve the functions explained in the above-described embodiment. For example, the mobile terminal may be a mobile phone, a personal computer (PC), or a tablet terminal.

The controllers of the mobile terminals 100A to 100C and the server 200 may be circuitry including logic circuits (hardware) provided on an integrated circuit (IC chip) or the like, one or more processors such as central processing units (CPUs) that operate in accordance with computer programs (software), or a combination thereof. For software, the mobile terminals 100A to 100C and the server 200 include, for example, a CPU that executes instructions of a program that is software achieving each function, a read-only memory (ROM) (referred to as a recording medium) or a storage device (referred to as a recording medium) recorded such that the program and various types of data can be read by an information processing device (or CPU), and a random access memory (RAM) that develops the program. The objective of the present invention is achieved by the information processing device (or CPU) reading the program from the recording medium and executing the program. Further, the program may be delivered to the information processing device via a transmission medium (for example, communication network or broadcast wave) that can transmit the program. The present invention may also be achieved by a mode of data signals embedded in carrier waves in which the program is achieved through electronic transmission.

The above-described program can be implemented by using, for example, script language such as ActionScript or JavaScript (registered trademark), object-oriented programming language such as Objective-C or Java (registered trademark), or a markup language such as HTML5. Further, the game system including the mobile terminal (for example, mobile terminal 100) provided with the units that achieve the functions achieved by the program and the server provided with the units that achieve the remaining functions, which differ from the functions of the mobile terminal 100, is within a scope of the present invention.

Although the present invention has been described based on the drawings and examples, it should be noted that those skilled in the art can easily make various modifications and corrections based on the present disclosure. Therefore, it should be noted that these variations and modifications are included in the scope of the present invention. For example, functions included in each means, each step, and the like can be rearranged so as not to be logically contradictory, and a plurality of means, steps, and the like can be combined or divided into one. The configurations illustrated in the above-described embodiments may be combined with each other.

DESCRIPTION OF REFERENCE CHARACTERS 10) player; 23) game content (card); 100) mobile terminal (information processing device); 110) communication device 120) memory; 130) controller; 140) display; 150) input receiver; 160) audio I/F; 200) server (information processing device); 210) communication device; 220) memory; 230) controller; 300) network

What is claimed is:

1. A non-transitory computer-readable medium that stores a program that, when executed by a computer, causes the computer to:
  transmit instructions to a terminal device, which includes a display that displays a graphical user interface, to generate the graphical user interface and to execute a game associated with a player on the graphical user interface of the display;
  in response to receiving an obtaining request inputted into the graphical user interface, select at least one first game content of a plurality of game contents based on the received obtaining request;
  obtain a validity period associated with the at least one first game content of the plurality of game contents, and transmit instructions to the terminal device to display the selected at least one first game content of the plurality of game contents to the player via the game executed on the graphical user interface;

in response to receiving a predetermined number of additional obtaining requests for one game content of the plurality of game contents, select a second game content of the plurality of game contents having a validity period that is set to be an unlimited period of time; and transmit instructions to the terminal device to display the second game content with the validity period that is set to be the unlimited period of time to the player via the game executed on the graphical user interface, wherein the program further causes the computer to transmit instructions to the terminal device to display the respective validity period on the graphical user interface of the display prior to selecting the respective game contents of the plurality of game contents, which includes at least one of the at least one first game content and the second game content.

2. The non-transitory computer-readable medium according to claim 1, wherein the program, when executed by the computer, further causes the computer to:

when receiving the additional obtaining requests, which are a number of obtaining requests that is less than the predetermined number, select and transmit, to the terminal device, one or more additional game contents having the validity period that is a limited period of time; and upon receiving the additional obtaining request that is equal to the predetermined number of additional obtaining requests, select and transmit, to the terminal device, the second game content with the validity period that is set to be the unlimited period of time, the second game content being the same as the at least one first game content or the one or more additional game contents.

3. The non-transitory computer-readable medium according to claim 1, wherein the at least one first game content is the same as the second game content.

4. The non-transitory computer-readable medium according to claim 1, wherein the at least one first game content is the same as the second game content, and the game content requested in the predetermined number of additional obtaining requests is for the same game content as the at least one first game content and the second game content.

5. The non-transitory computer-readable medium according to claim 1, wherein the program, when executed by the computer, further causes the computer to:

when receiving the additional obtaining requests, which are a number of obtaining requests that is less than the predetermined number, select and transmit, to the terminal device, an additional game content having a validity period.

6. The non-transitory computer-readable medium according to claim 5, wherein the program, when executed by the computer, further causes the computer to:

when none of the at least one first game content and the selected additional game content have a corresponding validity period that is set to be an unlimited period of time, select the second game content of the plurality of game contents having the validity period that is set to be an unlimited period of time.

7. The non-transitory computer-readable medium according to claim 5, wherein the program, when executed by the computer, further causes the computer to:

when at least one of the at least one first game content and the selected additional game content has a corresponding validity period that is set to be an unlimited period of time, select the second game content of the plurality of game contents having the validity period that is set to be an unlimited period of time, the selected second game content being a different game content than the at least one first game content and the additional game content.

8. The non-transitory computer-readable medium according to claim 1, wherein:

when the predetermined number of additional obtaining requests is a first predetermined number, the program, when executed by the computer, further causes the computer to, in response to receiving the first predetermined number of additional obtaining requests for one game content of the plurality of game contents, select and transmit, to the terminal device, one or more second game contents of the plurality of game contents having a validity period that is set to be an unlimited period of time, each second game content of the one or more second game contents having a first attribute.

9. The non-transitory computer-readable medium according to claim 8, wherein:

when the predetermined number of additional obtaining requests is a second predetermined number, which is different than the first predetermined number, the program, when executed by the computer, further causes the computer to, in response to receiving the second predetermined number of additional obtaining requests for one game content of the plurality of game contents, select and transmit, to the terminal device, one or more second game contents of the plurality of game contents having a validity period that is set to be an unlimited period of time, each second game content of the one or more second game contents having a second attribute, which is different than the first attribute.

10. A method comprising:

transmitting instructions to generate a graphical user interface, which is displayed on a display of a computer device, and to execute a game associated with a player on the graphical user interface of the display;

in response to receiving an obtaining request inputted into the graphical user interface, selecting at least one first game content of a plurality of game contents based on the received obtaining request;

obtaining a validity period associated with the at least one first game content of the plurality of game contents, and transmitting instructions to the computer device to display the selected at least one first game content of the plurality of game contents to the player via the game executed on the graphical user interface;

in response to receiving a predetermined number of additional obtaining requests for one game content of the plurality of game contents, selecting a second game content of the plurality of game contents having a validity period that is set to be an unlimited period of time; and transmitting instructions to the computer device to display the second game content with the validity period that is set to be the unlimited period of time to the player via the game executed on the graphical user interface, wherein instructions are transmitted to the terminal device to display the respective validity period on the graphical user interface of the display prior to selection of the respective game contents of the plurality of game contents, which includes at least one of the at least one first game content and the second game content.

11. An information processing device comprising:
a processor programmed to:
- transmit instructions to a terminal device, which includes a display that displays a graphical user interface, to generate the graphical user interface and to execute a game associated with a player on the graphical user interface of the display;
- in response to receiving an obtaining request inputted into the graphical user interface, select at least one first game content of a plurality of game contents based on the received obtaining request;
- obtain a validity period associated with the at least one first game content of the plurality of game contents, and transmit instructions to the terminal device to display the selected at least one first game content of the plurality of game contents to the player via the game executed on the graphical user interface;
- in response to receiving a predetermined number of additional obtaining requests for one game content of the plurality of game contents, select a second game content of the plurality of game contents having a validity period that is set to be an unlimited period of time; and
- transmit instructions to the terminal device to display the second game content with the validity period that is set to be the unlimited period of time to the player via the game executed on the graphical user interface, wherein the processor is further programmed to transmit instructions to the terminal device to display the respective validity period on the graphical user interface of the display prior to selecting the respective game contents of the plurality of game contents, which includes at least one of the at least one first game content and the second game content.

* * * * *